US009776111B2

(12) United States Patent
Schildermans et al.

(10) Patent No.: US 9,776,111 B2
(45) Date of Patent: Oct. 3, 2017

(54) DISC SHAPED FILTER ELEMENT

(75) Inventors: Inge Schildermans, Marke (BE);
Stefan Vandendijk, Tongeren (BE);
Marie Nguyen, Diest (BE)

(73) Assignee: Purolator Advanced Filtration,
Sprimont (BE)

( * ) Notice: Subject to any disclaimer, the term of this patent is extended or adjusted under 35 U.S.C. 154(b) by 105 days.

(21) Appl. No.: 13/809,079

(22) PCT Filed: Jun. 16, 2011

(86) PCT No.: PCT/EP2011/060049
§ 371 (c)(1),
(2), (4) Date: Jan. 8, 2013

(87) PCT Pub. No.: WO2012/004108
PCT Pub. Date: Jan. 12, 2012

(65) Prior Publication Data
US 2013/0112611 A1 May 9, 2013

(30) Foreign Application Priority Data

Jul. 9, 2010 (EP) .................................... 10169016

(51) Int. Cl.
*B01D 29/41* (2006.01)
*B01D 29/11* (2006.01)
*B01D 39/20* (2006.01)

(52) U.S. Cl.
CPC ............ *B01D 29/41* (2013.01); *B01D 29/111* (2013.01); *B01D 39/2034* (2013.01); *B01D 39/2044* (2013.01); *B01D 2239/0672* (2013.01); *B01D 2239/1233* (2013.01); *B01D 2239/1241* (2013.01); *Y10T 156/10* (2015.01)

(58) Field of Classification Search
None
See application file for complete search history.

(56) References Cited

U.S. PATENT DOCUMENTS

| 4,637,877 A | | 1/1987 | Hartmann et al. | |
| 4,902,420 A | * | 2/1990 | Pall et al. | ..................... 210/346 |
| 5,492,623 A | * | 2/1996 | Ishibe | ............................ 210/232 |
| 5,779,899 A | * | 7/1998 | Shiomi | .................. B01D 25/26 |
| | | | | 210/346 |

(Continued)

FOREIGN PATENT DOCUMENTS

| CN | 100337718 C | 9/2007 |
| CN | 101528319 A | 9/2009 |

(Continued)

*Primary Examiner* — Benjamin Kurtz
(74) *Attorney, Agent, or Firm* — Reinhart Boerner Van Deuren P.C.

(57) ABSTRACT

The invention relates to a disc shaped filter element for filtering a liquid such as a polymer. The filter element comprising—a hub, said hub defining a central opening therethrough, —an upper filter medium and a lower filter medium, said upper filter medium and said lower filter medium extending radially outwards from said hub. The upper filter medium and the lower filter medium comprise a layered structure comprising a first layer and a second layer. The first layer comprises a non-sintered metal fiber fleece and the second layer comprises a layer of non-sintered metal powder particles. The first layer and the second layer are sintered together.

8 Claims, 2 Drawing Sheets

(56) References Cited

U.S. PATENT DOCUMENTS 7,445,853 B2 * 11/2008 Losfeld .............. B01D 39/2027
428/212

FOREIGN PATENT DOCUMENTS

| CN | 202173834 U | 3/2012 |
|----|----|----|
| DE | 3537672 C1 | 5/1987 |
| DE | 8530013 U1 | 2/1988 |
| EP | 0 284 404 A2 | 9/1988 |
| EP | 0284404 A2 | 9/1988 |
| EP | 0 284 404 B1 | 5/1994 |
| EP | 1 862 207 A1 | 12/2007 |
| EP | 1862207 A1 | 12/2007 |
| GB | 1190844 | 4/1967 |
| GB | 2 208 378 A | 3/1989 |
| JP | S61 98517 A | 5/1986 |
| JP | 63-315111 A | 12/1988 |
| JP | H08182902 A | 7/1996 |
| JP | 09-011308 | 1/1997 |
| JP | 09-011308 A | 1/1997 |
| WO | WO 97/26974 A1 | 7/1997 |
| WO | WO 2009/010408 A1 | 1/2009 |

* cited by examiner

DISC SHAPED FILTER ELEMENT

TECHNICAL FIELD

The invention relates to a disc shaped filter element comprising an upper and lower filter medium, each of said upper and lower filter medium comprising a layered structure. The disc shaped filter element is suitable for the filtration of liquids, in particular for the filtration of viscous liquids such as polymers.

The invention further relates to a filter assembly comprising a number of disc shaped filter elements.

BACKGROUND ART

Disc shaped filter elements are known in the art. Disc shaped filter elements are for example used for the filtration of polymers for the production of polymer fibers, polymer films and polymer resin products. In polymer filtration filters need to capture impurities at the one hand and to shear the gels contained in the polymer at the other hand.

It is also known in the art to stack several disc shaped filter elements concentrically on a perforated tube. The particle loaded liquid is filtered through the disc shaped filter elements from the outside to the inside and the filtrate is discharged via the perforated tube.

Examples of disc-shaped filter elements are for example described in EP1862207 and EP284404.

EP1832207 describes disc shaped filter elements having a filter medium comprising metal fibers.

EP284404 describes disc shaped filter elements comprising a filter medium consisting of a porous sintered metal membrane and a porous sintered metal fiber membrane.

A problem associated with this type of disc shaped filter elements is that preferred paths are created during filtration. After a certain period of use, the shearing effect will end. The presence of preferred paths also means that there are "dead spots". Dead spots are areas of stagnation, where liquid fluid such as the polymer melt stagnates.

DISCLOSURE OF INVENTION

It is an object of the present invention to provide a disc shaped filter element avoiding the drawbacks of the prior art.

It is another object of the present invention to provide a disc shaped filter element having a low pressure drop.

It is a further object of the invention to provide a disc shaped filter element having filter media with a uniform flow velocity through the filter medium.

It is a further object of the invention to provide a disc shaped filter element whereby during filtration no preferred paths and consequently no dead spots are created.

It is still a further object of the invention to provide an assembly comprising a number of disc shaped filter elements.

According to a first aspect of the present invention a disc shaped filter element that is in particular suitable for the filtration of polymers is provided. The filter element comprises
- a hub, said hub defining a central opening therethrough,
- an upper filter medium and a lower filter medium, said upper filter medium and said lower filter medium extending radially outwards from said hub.

The space defined by the upper filter medium and the lower filter medium defines the inside of the filter element.

Preferably the filtration, for example the filtration of polymers, is done from the outside of the filter element to the inside of the filter element.

Both the upper and the lower filter medium comprise a layered structure comprising a first layer and a second layer. The first layer comprises a metal fiber fleece and the second layer comprises metal powder particles. The first and the second layer are sintered together.

Preferably, the first layer comprises a non-sintered metal fiber fleece. Preferably, the second layer comprises a layer of non-sintered metal powder particles.

In a preferred embodiment the first layer comprises a non-sintered metal fiber fleece and the second layer comprises a layer of non-sintered metal powder particles.

Both the upper and the lower filter medium comprise a layered structure comprising a first layer and a second layer. The first layer comprises a non-sintered metal fiber fleece and the second layer comprises non-sintered metal powder particles. The first and the second layer are sintered together.

The filter media according to the present invention comprise at least two layers, the first layer, i.e. the layer comprising metal fibers, is located at the in flow side of the filter element and the second layer, i.e. the layer comprising metal powder particles, is located at the outflow side of the filter element.

The function of the first layer is retaining impurities and allowing a good distribution of the liquid to be filtered over the medium.

The function of the second layer is shearing the polymer gels.

It is essential for the present invention that the first and second layer are sintered together.

By sintering the first and second layer together preferred paths between the first and second layer are avoided.

In filter elements known in the prior art, for example filter elements known from EP 284404, there is a gap between the separately sintered media.

This gap is for example due to the unevenness and/or roughness of the individual media. As the polymer to be filtered will always try to find the path with the lowest resistance, the polymer will flow in the gap between the different layers. Although the gaps of the prior art filters are small or even very small, these small gaps are enough to create preferred paths ands thus dead spots.

A disc shaped filter element according to the present invention will not suffer from these preferred paths.

First Layer

The first layer preferably comprises a non-woven metal fiber fleece.

The fibers preferably have an equivalent diameter ranging between 0.5 µm and 100 µm. More preferably, the equivalent diameter is between 0.5 µm and 50 µm, e.g. between 1 µm and 25 µm, such as 2 µm, 4 µm, 8 µm or 12 µm.

The metal fibers may be obtained by any technique known in the art, they may for example be obtained by bundle drawing or by foil shaving techniques.

The non-woven metal fiber fleece is preferably not sintered.

Possibly, the non-woven metal fiber fleece is compacted for example by means of a cold isostatic pressing operation.

The first layer has a porosity $P_1$. The porosity of the first layer $P_1$ is preferably higher than 50%, more preferably the porosity of the first layer $P_1$ is higher than 60%, for example 70% or 80%.

The first layer has a thickness $t_1$. The thickness of the first layer $t_1$ is preferably ranging between 0.15 and 0.4 mm and more preferably between 0.2 and 0.25 mm.

The first layer may consist of one metal fiber fleece or may comprise a stack of different metal fiber fleeces, each fleece comprising fibers with a specific equivalent diameter, fiber density and weight of the layer. The weight of the layer is expressed in g/m² and will hereafter be referred to as 'specific layerweight'.

Preferably, the individual metal fiber fleeces of the first layer are not sintered separately and the stack of metal fiber fleeces is not sintered.

Second Layer

The second layer comprises metal powder particles. As metal powder particles any known metal powder particles such as pulverised powder particles or atomised powder particles can be used. Either metal powder particles with a regular, spherical shape or metal powder particles with an irregular shape are suitable.

Irregular shapes and/or the sharp edges of the short metal fibres are extremely effective at shearing polymer gels as well as at removing impurities from the polymer melt.

The particles preferably have a particle size ranging between 20 and 500 µm, for example between 20 and 300 µm, between 20 and 100 µm or between 30 and 50 µm.

The second layer has a porosity $P_2$. The porosity of the second layer $P_2$ is lower than the porosity of the first layer $P_1$.

The porosity of the second layer $P_2$ is preferably ranging between 5 and 40%, and more preferably between 5 and 20%, for example between 10 and 20%.

The second layer has a thickness $t_2$. The thickness of the second layer layer $t_2$ is preferably ranging between 0.5 mm and 2 mm and more preferably between 0.8 and 1.2 mm.

It is preferred that the thickness of the second layer $t_2$ is higher than the thickness of the first layer $t_2$.

Furthermore, the porosity of the first layer $P_1$ is preferably higher than the porosity of the second layer $P_2$.

The first layer, i.e. the layer comprising metal fibers, acts as a distribution layer and may not be blocked during filtration. Therefore the first layer is preferably thin and porous, i.e. the first layer is preferably thinner than the second layer and the first layer has preferably a higher porosity than the second layer.

Any type of metal or metal alloy may be used to provide the fibers of the first layer or the metal powder particles of the second layer. The metal fibers and or particles are for example made of steel such as stainless steel. Preferred stainless steel alloys are AISI 300 or AISI 400-serie alloys, such as AISI316L or AISI 347, or alloys comprising Fe, Al and Cr, stainless steel comprising chromium, aluminium and/or nickel and 0.05 to 0.3% by weight of yttrium, cerium, lanthanum, hafnium or titanium, known as Fecralloy®, are used.

Metal fibers or metal powder particles may also be made of nickel or nickel alloys.

Metal fibers of the first layer and metal powder particles of the second layer may be made of the same metal or metal alloy or may be made of a different meal or metal alloy.

The first layer and the second layer may be made from different material. However, it is preferred that the first layer and the second layer are made of the same material.

The upper filter medium and the lower filter medium are preferably the same.

The hub is preferably made of metal, for example stainless steel metal. In a preferred embodiment the hub comprises a tubular metal part provided with a number of channels extending from the outer wall of the tubular part to the inner void of the tubular part.

The disc shaped filter element may comprise one or more supporting members. The supporting members preferably support the filter media. The supporting members are preferably liquid permeable, i.e. liquid may flow from one of the surfaces to the other surface and vice versa.

The support members may for example be perforated or expanded plates, such as expanded or perforated metal plates. Alternatively the support members may be meshes, such as a woven, braided, knotted, knitted or welded wire mesh from metal wires.

According to a second aspect of the present invention a filter assembly comprising at least one disc shaped filter element as described above is provided.

The filter assembly comprises a central tube through which the filtered liquid is carried away.

The disc shaped filter elements are mounted on said central axis.

According to a third aspect of the invention the use of a disc shaped filter element for the filtration of polymers is provided.

BRIEF DESCRIPTION OF FIGURES IN THE DRAWINGS

The invention will now be described into more detail with reference to the accompanying drawing wherein FIG. 1 is a schematic view of a first embodiment of a disc shaped filter element according to the present invention;

MODE(S) FOR CARRYING OUT THE INVENTION

Figure 1:
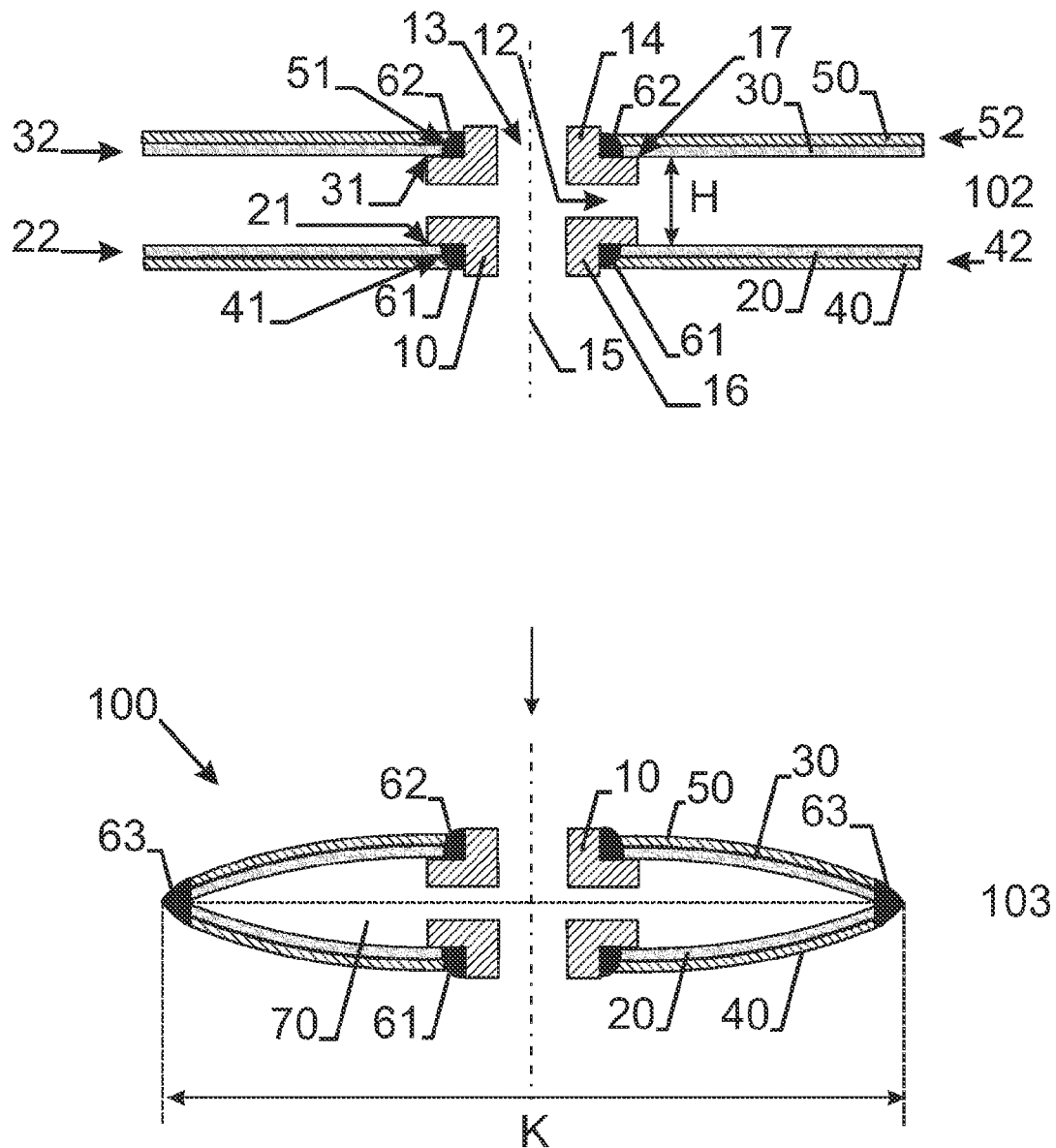

The following terms are provided solely to aid in the understanding of the invention. These definitions should not be construed to have a scope less than understood by a person of ordinary skill in the art.

The term "equivalent diameter" of a fiber is to be understood as the diameter of an imaginary circle, having the same surface as the average surface of a radial cross section of the fiber.

The term "porosity" P is to be understood as $P=100*(1-d)$ wherein d=(weight of 1 m³ sintered metal fiber medium)/ (SF) wherein SF=specific weight per m³ of alloy out of which the metal fibers of the sintered metal fiber medium are provided.

The term "ring shape-like" is to be understood as having a shape with an outer edge being substantially circular, and having an inner edge which inner edge encompasses the centre of the outer edge and which inner edge is usually concentric with the outer edge, although the inner edge is not necessarily circular. A circular inner edge is however preferred.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

A first embodiment of a disc shaped filter element 100 according to the present invention is set out schematically in FIG. 1.

The disc shaped filter element 100 comprises a hub 10. The hub 10 is has an outer wall 14, an inner void space 13 and at least one channel 12 extending from the inner void space 13 to the outer wall 14.

As shown in FIG. 1, the hub 10 is a tubular metal part having a central axis 15. The outer wall 14 of the tube has two rims 16 and 17, which are the coupling means of the hub. Through the wall of the tubular part a number of channels 12 is provided extending from the outer wall 14 to the inner void space 13.

The disc shaped filter element comprises an upper filter medium 50 and a lower filter medium 40. The upper filter medium 50 and the lower filter medium 40 both comprise a first layer and a second layer. The first layer comprises a non-sintered metal fiber fleece of metal fibers having a diameter ranging for example between 4 and 40 µm.

The second layer comprises a non-sintered metal powder particles having a particle size ranging for example between 20 and 500 µm.

The first layer has for example a thickness $t_1$ of 0.25 mm and the second layer has for example a thickness $t_2$ of 1.2 mm. In an alternative embodiment the second layer has a thickness $t_2$ of 0.6 mm.

The first layer and the second layer are sintered together.

The upper filter medium 50 and the lower filter medium 40 both are substantially ring-like shaped, substantially flat filter media having substantially the same diameter.

The inner edges 41 or 51 of the upper filter medium 50 and of the lower filter medium 40, are preferably substantially circular and preferably coincides with the diameter of the wall 14 of the hub.

Preferably, the upper filter medium and the lower filter medium are supported by a support member 20 and 30. The support members 20 and 30 are for example first and a second substantially identical ring-like shaped, substantially flat liquid permeable support members. The support members are liquid permeable support members, i.e. liquid may flow from the one surface of the support member to the other side of the support member.

Optionally, the support members may be perforated or expanded plates, such as expanded or perforated metal plates, or may be meshes, such as a woven, braided, knotted, knitted or welded wire mesh from metal wires. The support members used in FIG. 1 are liquid permeable plates, preferably stainless steel plates and preferably have a thickness in the range of 0.5 mm to 1 mm.

Each one of the plates is provided with apertures such as substantially rectangular slots having their long edge substantially in the radial direction of the disc.

The inner edge 21 and 31 of the support members 20 and 30 is preferably substantially circular and coincides with the diameter of the wall 14 of the hub 10 along the rim.

The upper filter medium 50 is brought into contact with a surface of the first support member 30. The lower filter medium 40 is brought into contact with a surface of support member 20. The combination of upper filter medium 50 and the first support member 30 is then mounted to the hub by bringing the inner edge 41 of the upper filter medium 50 and the inner edge 21 of the first support member 30 into contact with rim 16.

The combination of lower filter medium 40 and second support member 20 is then mounted to the hub 10 by bringing the inner edge 51 of the second filter membrane 50 and the inner edge 31 of the second support member 30 into contact with rim 17.

The inner edges 21 and 41 of the first filter membrane 10 and first support member are now liquid-tight coupled to the hub 10 at the rim 16.

In a similar way, the inner edges 31 and 51 of the first filter membrane 50 and first support member are now liquid-tight coupled to the hub 10 at the coupling means This coupling can be done by any suitable joining technique, e.g. by gluing or by welding. In the present example the coupling is obtained by TIG-welding. A weld coupling 61 or 62 is provided. Alternatively, other methods of welding such as but welding, capacitive discharge welding, resistance welding, ultrasonic welding, micro plasma welding or laser welding may be used. As an other alternative, soldering such as high temperature soldering or sintering, or brazing, or extrusion of polymer material, fluid tight folding or gluing, may be used to couple the hub, the filter membranes and the support members.

In a subsequent step, the outer edges 22, 32, 42 and 52 of the upper filter medium 50, the lower filter medium 40, the first support member 30 and the second support member 20 are bend to each other and liquid tight fixed to each other. The liquid tight fixing may be made with any suitable joining technique, e.g. preferably done by welding, preferably by TIG-welding. A weld coupling 63 is provided. Alternatively, other methods of welding such as but welding, capacitive discharge welding, resistance welding, ultrasonic welding, micro plasma welding or laser welding may be used. As an other alternative, soldering such as high temperature soldering or sintering, or brazing, or extrusion of polymer material, fluid tight folding or gluing, may be used to couple the first filter membrane 40 and the second filter membrane 50.

Figure 2:
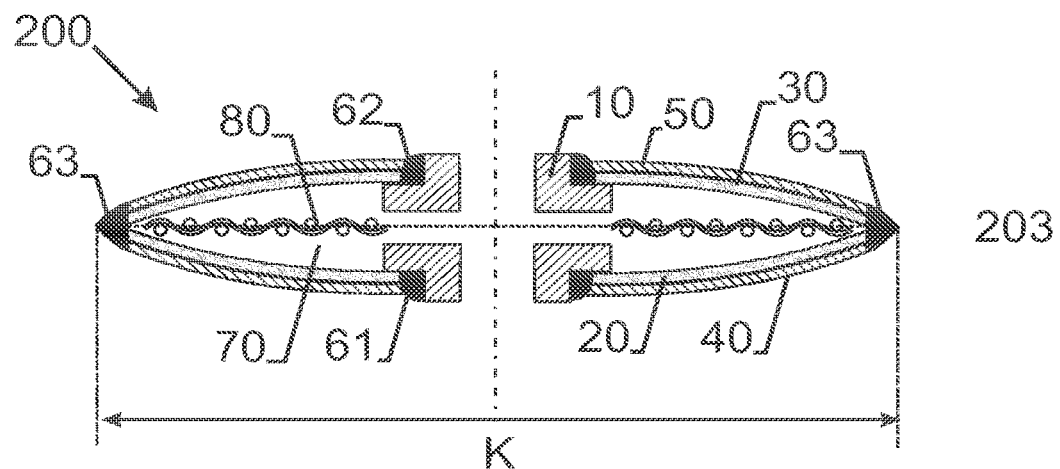
FIG. 2 is a schematic view of an alternative embodiment of a disc shaped filter element according to the present invention.

An alternative embodiment of a disc shaped filter element 200 is schematically shown in FIG. 2. Identical numbers refer to identical features of FIG. 1. Between the two support members 20 and 30 a further spacing means 80 is provided in the void space 70. This spacing means may be one or optional more than one wire mesh. The spacing means is preferably made of metal. An example of a spacing means comprises a wire mesh of stainless steel wires.

Figure 3:
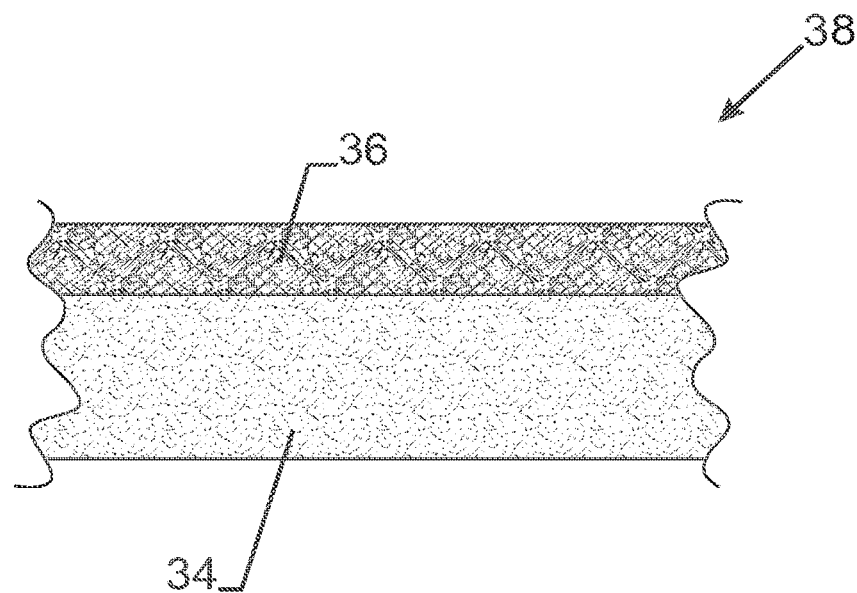
FIG. 3 is a schematic view of a filter medium according to the present invention.

Referring to FIG. 3, a filter medium 38 according to the present invention comprises a layered structure having a first layer 36 and a second layer 34.

The first layer comprises a non-sintered non-woven metal fiber fleece. The metal fibers of the first layer have an equivalent diameter of for example 12 µm. The pore size of the first layer is 40 µm. The first layer has a thickness of for example 0.25 mm.

The first layer is manufactured as follows:

Steel fibers are made by means of bundle drawing. A non-woven metal fiber fleece is then produced by means of a random feeder apparatus which is for example disclosed in GB 1 190 844.

The second layer comprises a non-sintered metal powder particulate layer. The metal powder particles have for example a particle size ranging between 20 and 500 µm, for example ranging between 20 and 40 µm. The pore size of the second layer is for example 20 µm. The second layer has a thickness of for example 1.2 mm. The metal powder particles used are for example pulverized powder particles.

During polymer filtration the first layer retains the impurities and allows a good distribution of the liquid to be filtered over the filtered medium, whereas the second layer allows the shearing of the polymer gels.

A big advantage of the filter medium according to the present invention is that during filtration no preferred paths are created. As no preferred paths are created, no dead spots are created in the filter medium.

It is to be understood that although preferred embodiments, specific constructions and configurations, as well as materials, have been discussed herein for devices according to the present invention, various changes or modifications in form and detail may be made without departing from the scope and spirit of this invention.

The invention claimed is:

1. A disc shaped filter element for filtering a liquid from the outside to the inside of said filter element, said filter element comprising
   hub, said hub defining a central opening therethrough,
   an upper filter medium and a lower filter medium, said upper filter medium and said lower filter medium extending radially outwards from said hub, said upper filter medium and said lower filter medium comprising a layered structure comprising a first layer and a second layer, said first layer comprising a metal fiber fleece that is compacted by cold isostatic pressing and is non-sintered until sintering to the second layer, and said second layer comprising a layer of metal powder particles that is non-sintered until sintering to the first layer, said first layer and said second layer being sintered together, wherein the layered structure does not include preferred pathways.

2. A disc shaped filter element according to claim 1, wherein said first layer comprises metal fibers having an equivalent diameter ranging between 0.5 μm and 100 μm.

3. A disc shaped filter element according to claim 1, wherein said first layer has a thickness $t_1$ and said second layer has a thickness $t_2$ said thickness of said second layer $t_2$ being higher than said thickness of said first layer $t_1$.

4. A disc shaped filter element according to claim 1, wherein said first layer has a porosity $P_1$ and said second layer has a porosity $P_2$, said porosity of said first layer $P_1$ being higher than said porosity of said second layer $P_2$.

5. A disc shaped filter element according to claim 1, wherein said first layer has a thickness ranging between 0.15 and 0.4 mm and wherein said second layer has a thickness ranging between 0.5 and 2 mm.

6. A disc shaped filter element according to claim 1, wherein filter media are supported by at least one liquid permeable supporting member.

7. A disc shaped filter element according to claim 6, wherein said supporting member comprises a perforated plate or a mesh.

8. A filter assembly comprising a central tube and a number of disc shaped filter elements as defined in claim 1, said disc shaped filter elements being mounted on a central axis, the filtered liquid being carried away through said central tube.

* * * * *